United States Patent [19]
Turner

[11] 3,980,409
[45] Sept. 14, 1976

[54] EXTENSIBLE TOOL FOR HANDLING ENERGIZED ELECTRIC EQUIPMENT

[75] Inventor: William F. Turner, Glen Ellyn, Ill.

[73] Assignee: Square D Company, Park Ridge, Ill.

[22] Filed: Oct. 29, 1974

[21] Appl. No.: 518,681

Related U.S. Application Data

[63] Continuation of Ser. No. 415,884, Nov. 14, 1973, abandoned.

[52] U.S. Cl. ............................... 403/108; 403/328; 248/188.5
[51] Int. Cl.$^2$ ........................................... F16B 7/14
[58] Field of Search .................... 403/108, 109, 328; 248/188.5, 333; 135/46 T

[56] References Cited
UNITED STATES PATENTS

| | | | |
|---|---|---|---|
| 1,797,019 | 3/1931 | Polansky | 135/46 T |
| 1,896,469 | 2/1933 | Soll | 403/109 |
| 3,103,375 | 9/1963 | McMullin | 248/188.5 X |

FOREIGN PATENTS OR APPLICATIONS

| | | | |
|---|---|---|---|
| 1,013,803 | 5/1952 | France | 248/188.5 |
| 394,955 | 12/1908 | France | 403/108 |
| 390,554 | 2/1924 | Germany | 135/46 T |

Primary Examiner—Andrew V. Kundrat
Attorney, Agent, or Firm—Harold J. Rathbun; Carmen B. Patti

[57] ABSTRACT

The tool comprises a plurality of tubular telescoping sections of insulating material arranged in a series. Each of the sections, except a most rearward end section, has a forwardly facing annular exterior shoulder at its rearward end and each of the sections, except a most forward end section, has a rearwardly facing annular interior shoulder at its forward end. When the tool is fully extended for use, each rearwardly facing shoulder engages a forwardly facing shoulder and radial apertures in the sections are in alignment. A pin support located within the rearward end of each section except the most rearward section contains a pin which is biased outwardly by a compression spring through the aligned apertures thus locking the sections in their extended positions with respect to each other. The pins, aligned openings, and shoulders are relatively positioned so that pulling forces are opposed by the shoulders and not the pins.

15 Claims, 6 Drawing Figures

EXTENSIBLE TOOL FOR HANDLING ENERGIZED ELECTRIC EQUIPMENT

This is a continuation, of application Ser No. 415,884, filed Nov. 14, 1973 now abandoned.

BACKGROUND OF THE INVENTION

Energized electrical equipment is generally handled remotely by a lineman with an insulated tool for safety. A typical operation is the opening and closing of devices such as disconnect switches or cutouts requiring respective pulling and pushing operations with the insulated tool. Such operations subject an insulated tool to severe longitudinal forces especially in applications requiring the opening of a device which may be difficult to open as a result of disuse for a long period of time.

Many existing extensible tools place the entire longitudinal loads on pin members which interconnect the telescoping sections. A need exists for a stronger and more durable tool whereby longitudinal pulling forces are borne by annular shoulders and not the pins.

SUMMARY OF THE INVENTION

This invention relates to an improved extensible tool for manipulating energized electrical equipment. The tool is sectionalized and each section except a rearward end section has an outer diameter of such size that it telescopes into a next adjacent rearward and larger section. A forward facing annular exterior shoulder is provided at the rearward end of each section, except the most rearward section, either by an integral enlarged portion or by a separate band or ring. When the tool is extended, each exterior shoulder seats against a rearward facing interior shoulder positioned near the forward end of the next adjacent larger section. When any two sections are fully extended with respect to each other, radial openings in the two sections are aligned and a pin disposed within a support member in the rearward end of one of the two sections, extends through the aligned openings as a result of force exerted by a spring thus holding the two sections securely in non-rotatable and non-collapsible positions with respect to each other.

Each pair of aligned openings and each pair of abutting shoulders adjacent thereto when the tool is extended are so positioned that, upon a pulling operation of the tool, the longitudinal force is borne by the shoulders and not by the pins.

It is an object of the invention to provide an improved extensible tool for use on energized electrical equipment and which is collapsible so as to be storable in a very limited space.

Another object is to provide an improved extensible tool which can be secured in its fully extended position with the sections being neither relatively rotatable nor relatively longitudinally movable with respect to each other.

A further object is to provide an improved extensible tool capable of exerting relatively strong longitudinally pulling and pushing forces selectively with the pulling forces being placed on a body portion of each section rather than on retaining pins and the supports therefor.

BRIEF DESCRIPTION OF THE DRAWINGS

Other objects and advantages of the invention will become apparent from the following description wherein reference is made to the accompanying drawings, in which.

DESCRIPTION OF THE PREFERRED EMBODIMENT

Figure 1:
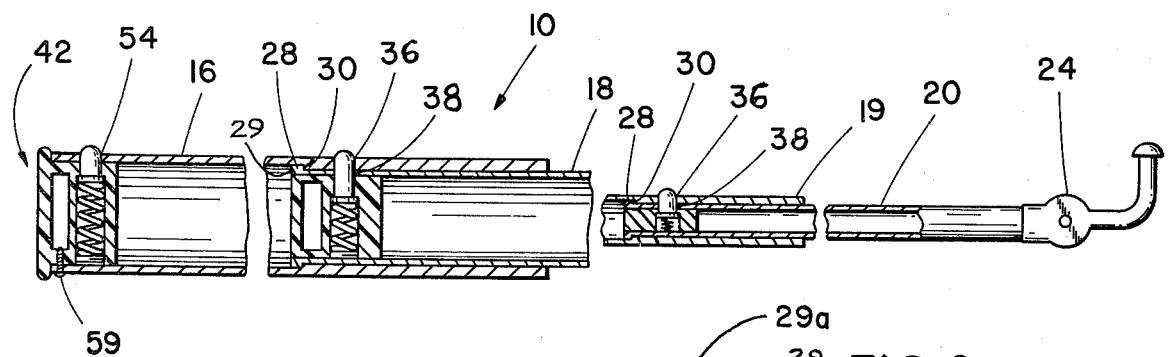
FIG. 1 is diametrical cross-sectional view of an extensible tool constructed in accordance with the invention with the sections shown fragmentarily and some intermediate sections of the tool omitted because of space limitations.

A tool 10 in accordance with the preferred embodiment of the invention illustrated in the drawings comprises a plurality of extensible sections only four of which are shown at 16, 18, 19 and 20. The sections are of progressively smaller size from the rear to the forward end and each is a cylindrical tube formed of insulating material preferably by a molding process. It should be understood that any practical number of sections may be used. The rearward end section 16 has the largest diameter and serves as a handle or gripping member, and the forward end section 20 has the smallest diameter and may carry a hook 24 or other manipulating device at its forward end. The internal and exterior diameters of the sections are such that each except the section 16 may telescope snugly within the next adjacent larger section.

Figure 6:
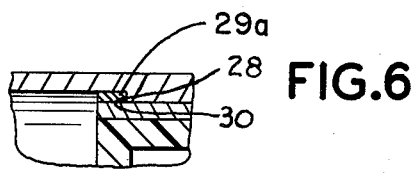
FIG. 6 is a cross-sectional view of a portion of the junction of two intermediate sections of the tool of FIG. 1 when extended showing a bonded ring defining an annular exterior shoulder.

Each section, with the exception of the rearward end section 16, has a forwardly facing exterior annular shoulder 28 thereon near the rearward end thereof. Each shoulder 28 may be defined by a forward facing edge of a flange 29 formed on the outer surface of the tubular body of the section during the molding process. Alternatively, an annular ring 29a, as shown in FIG. 6, may be bonded to the outer surface of the tubular body of each of the sections except the section 16, a forward edge face of each ring 29a defining one of the exterior shoulders 28. A rearwardly facing interior annular shoulder 30 is formed near the forward end of each section except the forward end section 20 by a change in internal diameter of the body of the section. A first radial aperture 36 is positioned forwardly of and adjacent to each interior rearwardly facing shoulder 30, and a second radial aperture 38 is positioned forwardly of an adjacent to each exterior shoulder 28.

Figure 2:
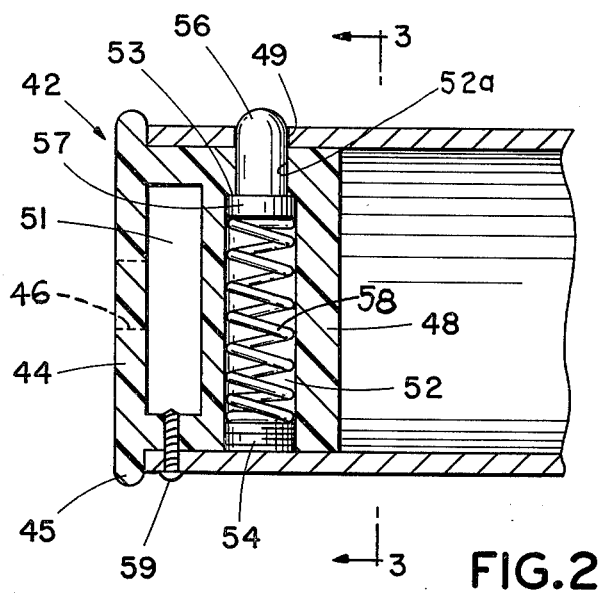
FIG. 2 is an enlarged diametrical cross-sectional view of the rearward end of the rearward end section of the tool shown in FIG. 1.
Figure 3:
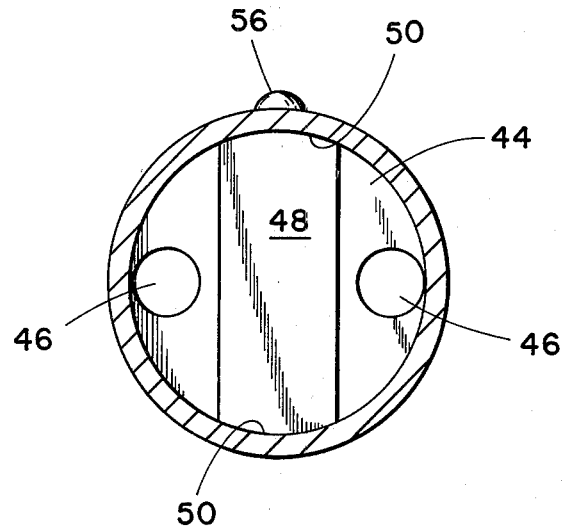
FIG. 3 is a sectional view taken generally along the line 3—3 of FIG. 2.

As shown in FIGS. 1, 2 and 3, the rearward end section 16 has a flanged cap 42 installed at its rearward end. The cap 42 has a disc portion 44 defining a flange 45 abutting the rearward end face of the section 16. A pair of circumferentially spaced vent openings 46 extend through the portion 44 on opposite sides of an integral pin support portion 48 extending forwardly from the disc portion 44 to a point forward of a radial aperture 49 through the wall of section 16. The support portion 48 has radially opposed curved end walls 50 which snugly fit within the rearward end of section 16 and a hollow portion 51 provided for ease of moldability. A cylindrical radially directed cavity 52 extending through the support portion 48 has one end portion 52a of smaller diameter than the remainder defining an inwardly directed annular shoulder 53. A plug 54 closes the unreduced end portion of the cavity 52.

A round headed pin 56 having an annular end flange 57 is disposed in the cavity 52 and is biased outwardly by a coil spring 58 disposed within the larger portion of the cavity 52. When the cap 42 is fully inserted in the rear end of the passage in the section 16, the pin 56 is biased outwardly by the spring 58 so that the flange 57 abuts the shoulder 53 and an outer end portion of the pin 56 extends through the aperture 49. A screw 59 connects the cap 42 to the wall of section 16 and, in combination with the pin 56, prevents the cap 42 from being inadvertently displaced from the passages of the section 16.

Figure 4:
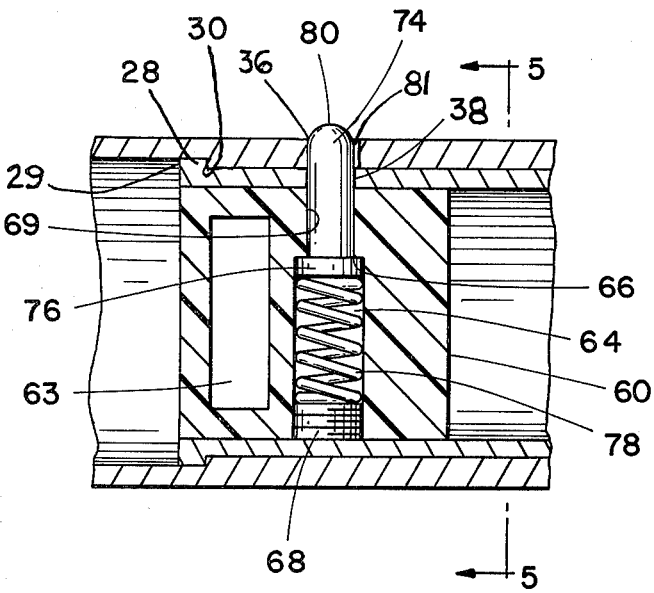
FIG. 4 is an enlarged diametrical view of two intermediate sections of the tool of FIG. 1 with the sections locked in extended position.
Figure 5:
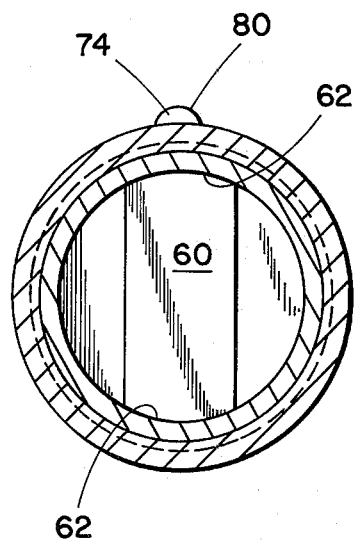
FIG. 5 is a sectional view taken generally along the line 5—5 of FIG. 4.

As shown in FIGS. 1, 4, and 5, a pin support 60 is disposed in the rearward end of the passage of each of the sections except the most rearward section 16. Each support 60 has radially opposed curved end wall portions 62 so that each support 60 snugly fits within the end of the passage of its respective section. A hollow portion 63 is provided near the rearward end of the support 60 for easier moldability. The portion 63 may be omitted in the smaller pin supports as shown in FIG. 1 at the rearward end of the section 20.

Each support 60 has a cylindrical radially directed cavity 64 aligned with the second aperture 38 of its section, each cavity 64 having an inwardly directed shoulder 66, formed by a change in diameter of the cavity, and being closed at its larger end by a plug 68. A smaller end 69 of each cavity 64 is aligned with its associated aperture 38.

A pin 74, which may be like the pin 56, has a flange 76 at its inner end and is disposed within each cavity 64. The flange 76 of each pin 74 is adapted to abut against the shoulder 66 of its associated cavity 64 to limit outward movement of each pin 74. A coil spring 78 is disposed between each plug 68 and each flange 76 and urges its associated pin 74 outwardly until the flange 76 thereof abuts the shoulder 66 of its cavity and the outer end of its associated pin 74 extends into and through the aligned one of the apertures 28.

Each pin 74 has a rounded, i.e., partially spherical, outer end face 80. During the procedures of extending or collapsing the sections of the tool 10, each face 80 rides along the inner wall of the passage of the next adjacent larger one of the sections.

When any two of the sections are fully extended, the exterior shoulder 28 on the inner or smaller section abuts the interior shoulder 30 within the outer or larger section, and the respective apertures 36 and 38 are generally aligned. Each second aperture 38 is smaller than each first aperture 36, and the generally aligned pairs of apertures 36 and 38 are positioned so that a gap 81 exists between the forward side of associated one of the pins 74 and the forward side of the aperture 36. The staggered relationship of the pairs of openings 36 and 38 assures that the longitudinal pulling forces is borne by the abutting shoulders 28 and 30 and not pins 74 and their associated pin supports 60. Each pin 74 is of sufficient length such that it extends through its associated apertures 36 and 38 when any two sections are extended thus providing a positive mechanical lock therebetween.

In operation, the sections 16, 18, 19, and 20 of the tool 10 are placed in extended position by moving the sections longitudinally with respect to each other until the exterior shoulder 28 on each smaller section abuts the interior shoulder 30 on the next adjacent larger section. As the tool 10 is extended, the internal volume of the tool 10 increases drawing air inwardly through the openings 46 in the cap 42.

If the apertures 36 and 38 of two extended adjacent sections are not circumferentially aligned, alignment may be readily accomplished by rotating one of the sections with respect to the other until the openings are in alignment. At that time, the associated spring 78 urges one of the pins 74 outwardly through the generally aligned openings and the sections will be locked in their extended positions with respect to each other.

To collapse the tool 10, each pin 74 is depressed and each smaller section is moved inwardly of the next adjacent larger section. As the tool 10 is collapsed the internal volume defined by the sections decreases, and, accordingly, air escapes through the openings 46.

The tool which may exceed forty feet in length, is constructed of insulating material such as fiberglass in order to provide the necessary electrical clearances.

Thus it is apparent that there has been provided, in accordance with the invention, an extensible tool that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An extensible tool for handling energized electrical equipment comprising:
   a. a plurality of telescoping cylindrical tubular sections of insulating material each having a longitudinal passage and arranged in series so that the tool when extended is of reduced transverse cross section progressively from a rear to a forward end, each of the sections except a most rearward section having an outer diameter of such size that it slidably fits in the next rearwardly adjacent larger section;
   b. a rearwardly facing annular interior shoulder positioned near the forward end of each of the sections except a most forward section;
   c. a forwardly facing annular exterior shoulder positioned near the rearward end of each of the sections except the most rearward section and defined by an edge face of a ring surrounding its associated section and bonded to the exterior surface of the section;
   d. a first radial aperture in each section except the most forward section positioned forwardly of and adjacent to the rearwardly facing shoulder of its section;
   e. a second radial aperture in each section except the most rearward section positioned forwardly of and adjacent to the forwardly facing shoulder of its section;
   f. each forwardly facing shoulder, when the tool is fully extended, being in engagement with the rearward facing shoulder of the next adjacent larger section and the first apertures being in substantial alignment respectively with the second apertures;

g. a pin support disposed within each section except the most rearward section and having a cavity coaxial with the second aperture of its section; and h. a pin and a spring disposed within each cavity, each spring biasing its associated pin radially outwardly for causing an end portion of its associated pin to extend into the second aperture of its section, and, when the tool is fully extended, for causing the end portion of its associated pin to extend into the first aperture of the next larger section, thereby to lock the sections in their extended positions with respect to each other.

2. An extensible tool as claimed in claim 1 wherein each section is formed by a molding process and the annular exterior shoulder thereon is formed during the molding process.

3. An extensible tool as claimed in claim 1 wherein each pin support only partially blocks the passage through its associated section and has opposed curved end portions fitted snugly against the interior of the passage.

4. An extensible tool as claimed in claim 1 wherein each first aperture is larger than its associated second aperture, each associated first and second aperture are positioned relative of each other when the shoulders of their respective sections abut so that a gap exists between the forward side of the pin and the forward edge of the first aperture end whereby longitudinal pulling forces on the tool are borne only by the shoulders.

5. An extensible tool as claimed in claim 1 wherein each pin support has a rearward end face generally coplanar with the rearward end face of its associated section.

6. An extensible tool as claimed in claim 1 wherein each support has a diameter less than any portion of the rearward end of its associated section.

7. An extensible tool as claimed in claim 1 wherein the shoulders are radially disposed with respect to the longitudinal axes of their associated sections.

8. An extensible tool as claimed in claim 1 wherein the most rearward section has a rear radial aperture near its rearward end and a cap is positioned in the rearward end of the passage of the section, the cap has an apertured flange portion blocking entry to its passage, a shank portion provided with curved portions fitted snugly against the interior of the passage, and a cylindrical cavity coaxial with the rear radial aperture of the section, a pin is disposed within the cavity in the cap, a compression spring biases the pin radially outwardly so that an end portion thereof extends into the rear radial aperture of the section.

9. An extensible tool for handling energized electrical equipment comprising:

a. a plurality of telescoping cylindrical tubular sections of insulating material each having a longitudinal passage and arranged in series so that the tool when extended is of reduced transverse cross section progressively from a rear to a forward end, each of the sections except a most rearward section having an outer diameter of such size that it slidably fits in the next rearwardly adjacent larger section;

b. a rearwardly facing annular interior shoulder positioned near the forward end of each of the sections except a most forward section;

c. a forwardly facing annular exterior shoulder positioned near the rearward end of each of the sections except the most rearward section;

d. a first radial aperture in each section except the most forward section positioned forwardly of and adjacent to the rearwardly facing shoulder of its section;

e. a second radial aperture in each section except the most rearward section positioned forwardly of and adjacent to the forwardly facing shoulder of its section;

f. each forwardly facing shoulder, when the tool is fully extended, being in engagement with the rearward facing shoulder of the next adjacent larger section and the first apertures being in substantial alignment respectively with the second apertures;

g. a pin support disposed within each section except the most rearward section and having a cavity coaxial with the second aperture of its section;

h. a pin and a spring disposed within each cavity, each spring biasing its associated pin radially outwardly for causing an end portion of its associated pin to extend into the second aperture of its section, and, when the tool is fully extended, for causing the end portion of its associated pin to extend into the first aperture of the next larger section, thereby to lock the sections in their extended positions with respect to each other; and i. a rear radial aperture near the rearward end of the most rearward section having a cap positioned in the rearward end of the passage of the section, the cap having an apertured flange portion blocking entry to the passage, a shank portion provided with curved portions fitted snugly against the interior of the passage, and a cylindrical cavity coaxial with the rear radial aperture of the section, a pin disposed within the cavity in the cap and a compression spring for biasing the pin radially outwardly so that an end portion thereof extends into the rear radial aperture of the section.

10. An extensible tool as claimed in claim 9 wherein each annular exterior shoulder is defined by an edge face of a ring surrounding its associated section and bonded to the exterior surface of the section.

11. An extensible tool as claimed in claim 9 wherein each pin support only partially blocks the passage through its associated section and has opposed curved end portions fitted snugly against the interior of the passage.

12. An extensible tool as claimed in claim 9 wherein each first aperture is larger than its associated second aperture, each associated first and second aperture are positioned relative of each other when the shoulders of their respectve sections abut so that a gap exists between the forward side of the pin and the forward edge of the first aperture end whereby longitudinal pulling forces on the tool are borne only by the shoulders.

13. An extensible tool as claimed in claim 9 wherein each pin support has a rearward end face generally coplanar with the rearward end face of its associated section.

14. An extensible tool as claimed in claim 9 wherein each support has a diameter less than any portion of the rearward end of its associated section.

15. An extensible tool as claimed in claim 9 wherein the shoulders are radially disposed with respect to the longitudinal axes of their associated sections.

* * * * *